Nov. 4, 1958 R. M. DUNHAM 2,859,347

PHASE DISCRIMINATORS

Original Filed Oct. 16, 1952

INVENTOR
RICHARD M. DUNHAM
BY Elmer J. Gorn
ATTORNEY

United States Patent Office 2,859,347

Patented Nov. 4, 1958

2,859,347

PHASE DISCRIMINATORS

Richard M. Dunham, Wayland, Mass., assignor to Raytheon Manufacturing Company, Newton, Mass., a corporation of Delaware Continuation of application Serial No. 315,148, October 16, 1952. This application May 16, 1956, Serial No. 585,189

9 Claims. (Cl. 250—36)

This is a continuation of my application, Serial No. 315,148, filed October 16, 1952, now abandoned.

This invention relates to phase discriminator ciruits, and more particularly to such a circuit used to control the frequency of a voltage-sensitive oscillator by means of a regulating voltage depending upon the phase difference between the leading edges of the pulse to be regulated and the synchronizing pulse.

It is frequently necessary to control the frequency of an oscillator with reference to synchronizing pulses. Certain types of oscillators, such as an astable plate-to-grid coupled multivibrator, may be controlled in frequency by the voltage applied to them. In the present invention, such a voltage is made dependent upon the phase difference between the wave forms of the controlled oscillations and the synchronizing pulses. This voltage is obtained by clamping the synchronizing pulses to the wave form to be regulated, and applying the clamped pulses to the grid of a second cathode follower normally biased to cutoff which has a grid-controlled tube as its load impedance. This grid-controlled tube is normally biased to cutoff and the synchronizing pulses applied to its grid. The voltage appearing across the plate-to-cathode circuit of the output tube is a pulse varying in amplitude with the difference in phase between the synchronizing pulse and the wave form of the output of the controlled oscillator. This pulse is integrated in a capacitor and applied through a cathode follower to the controlled oscillator to maintain its frequency at the desired value.

Figure 1:
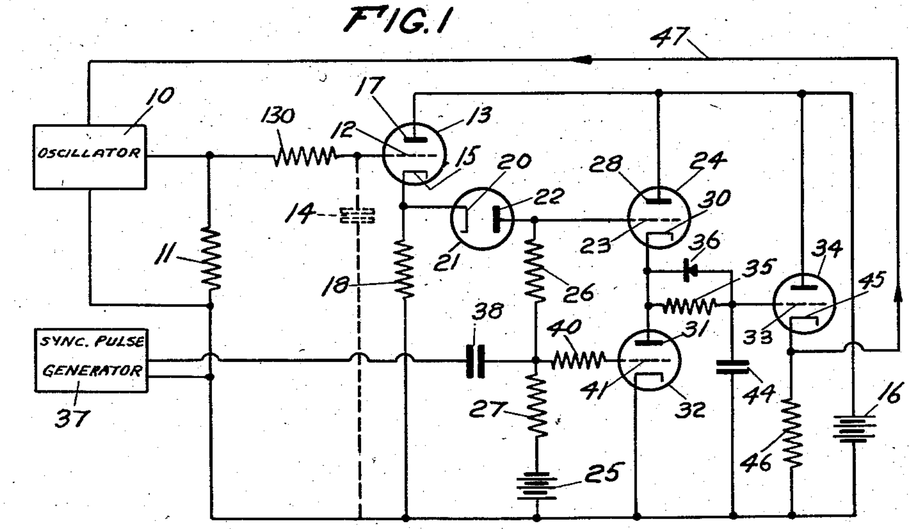
Figures 2A, 2B, 2C, 2D:
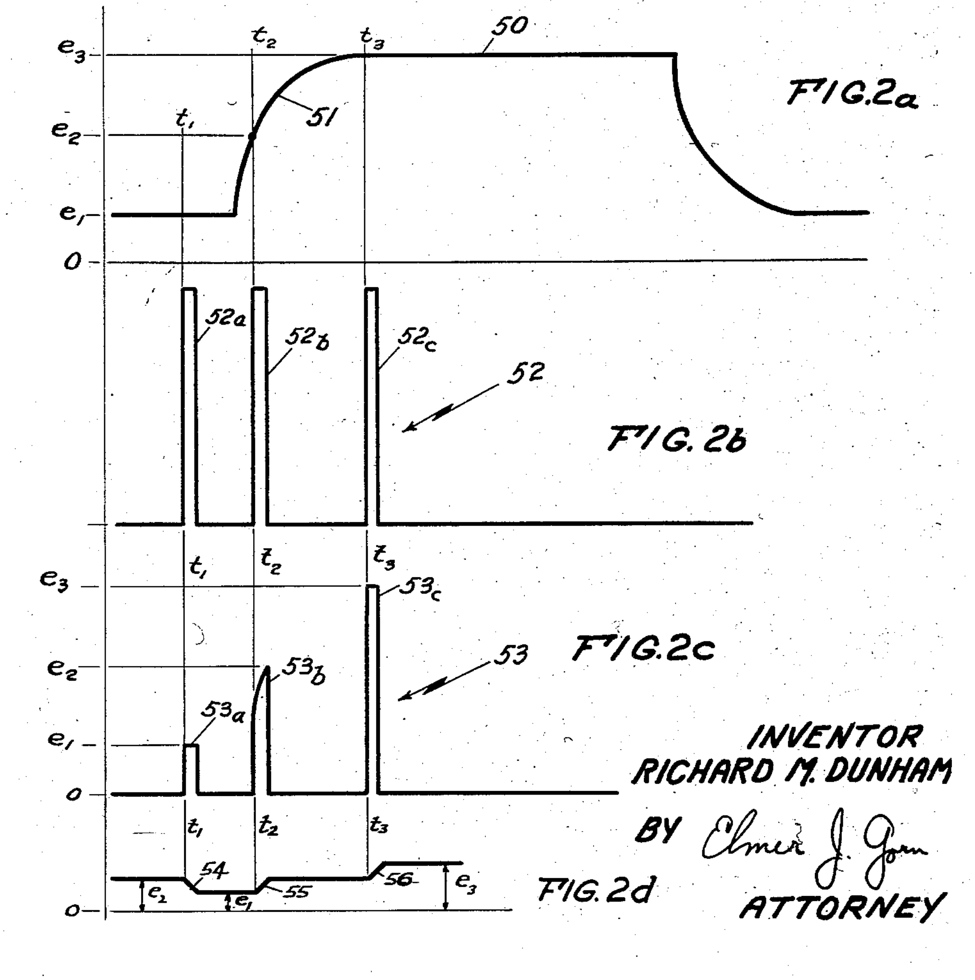

Other and further advantages of this invention will be apparent as the description thereof progresses, reference being had to the accompanying drawings wherein:

Fig. 1 is a schematic diagram of an embodiment of the invention;

Fig. 2*a* is a voltage-time graph of the wave form of the output of the oscillator to be controlled;

Fig. 2*b* is a voltage-time graph of the synchronizing pulses;

Fig. 2*c* is a voltage-time graph of the voltage appearing at the grid of the second cathode follower with different phase relationships between the synchronizing pulse and the leading edge of the output of the controlled oscillator; and Fig. 2*d* is a voltage-time graph of the voltage appearing across a capacitor in the input to the second cathode follower.

In Fig. 1, the reference numeral 10 represents a voltage-sensitive oscillator of one of the well-known types. For convenience, the output of this oscillator will be considered to be square waves, although the principle of the invention will operate just as well with oscillators producing other wave forms. The output of the oscillator 10 appears across a resistor 11 and is applied to the grid 12 of a triode cathode follower 13. A capacitor 14, shown in dotted lines, may be connected between the grid 12 and the cathode 15 of the tube 13 for a purpose to be explained later. A source of positive potential

16 is connected between the plate 17 and the cathode 15 of tube 13 through a load resistor 18. The cathode 15 of the tube 13 is connected to the cathode 20 of a diode 21, the plate 22 of which is connected to the grid 23 of a second cathode follower 24. The grid 23 of the second cathode follower 24 is connected to a source of negative potential 25 through two resistors 26 and 27 connected in series. The plate 28 of the cathode follower 24 is connected to the source 16 of positive potential. The cathode 30 of the second cathode follower 24 is connected to the plate 31 of a tube 32, and to the grid 33 of a third cathode follower 34 through a resistor 35 shunted by a rectifier 36. A source 37 of synchronizing pulses is coupled through a capacitor 38 and a resistor 40 to the grid 41 of the tube 32. A capacitor 44 is connected between the grid 33 and cathode 45 of the third cathode follower 34 through a resistor 46. The output of the third cathode follower 34, taken from across the load resistor 46, is connected to a control point on the controlled oscillator 10 over conductor 47. This control point depends, of course, on the type of oscillator used. In the case of an astable multivibrator, this would be the grid of one or both of the tubes.

The operation of the circuit of Fig. 1 is best understood with reference to the voltage-time diagrams of Figs. 2*a*, 2*b*, and 2*c*. In Fig. 2*a*, the graph 50 represents the wave form of an output pulse of the oscillator 10. This wave form has an initial value $e_1$ at a time $t_1$ and a maximum value $e_3$ at a time $t_3$. Halfway up the leading edge 51 of the pulse 50 it has a value $e_2$ at a time $t_2$. The capacitor 14 shown in dotted lines, which may be the grid-to-cathode capacity of the tube 13, together with the resistor 130, form an integrating circuit which serves to lengthen the rise time of the leading edge 51 of the pulse 50 where necessary.

Fig. 2*b* shows the synchronizing pulses 52. These pulses will be seen to have an amplitude greater than the value $e_3$, the maximum value of the wave 50, and a duration that is short with respect to that of the oscillator output pulse 50. Three possible positions with respect to time are shown. One such pulse **52*a* is shown occurring at the time $t_1$ when the amplitude of the oscillator pulse is $e_1$, a second such pulse 52*b* is shown occurring at a time $t_2$ when the amplitude of the oscillator pulse is $e_2$, and a third pulse 52*c*** is shown occurring at a time $t_3$ when the amplitude of the oscillator pulse is $e_3$.

In operation, assuming that the synchronizing pulse occurs at the time $t_2$ when the oscillator wave form has reached the value $e_2$ halfway to its maximum, the cathode follower 13 conducts, producing a positive potential across the resistor 18. The positive synchronizing pulse **52*b* appears at the grids 23 and 41. The diode 21 conducts, limiting the potential at the plate 22 to the instantaneous potential appearing at the cathode 20. This potential is dependent upon the instantaneous value of the wave form 50. This will have a value $e_2$ at the time $t_2$, a value $e_1$ at an earlier time $t_1$, and a value $e_3$ at a later time $t_3$. The result is pulse 53 appearing at the grid 23 of the tube 24 which will have the form 53*b* if the synchronizing pulse 52 occurs at time $t_2$ when the leading edge 51 of the wave form 50 has reached the halfway point. It will have the form 53*a* if the synchronizing pulse 52 occurs at time $t_1$ when the wave form 50 is at a minimum value. It will have the form 53*c* if the synchronizing pulse 52 occurs at time $t_3$ when the wave form 50 has reached its maximum value $e_3$. It will be seen that this pulse 53 has the same duration as the synchronizing pulse and has an amplitude dependent upon the voltage $e$, which, in turn, is dependent upon the phase difference between the leading edges of the oscillator pulse 50** and the synchronizing pulse 52. The appearance of this positive pulse 53 at the grid 23 of tube 24 tends to cause it to conduct, particularly as tube 32 will be conducting due to the presence of the synchronizing pulse 52 at its grid 41. However, the capacitor 44 assumes a charge whenever tube 24 conducts by drawing current from the source 16 through tube 24 and resistor 35. When the tube 24 ceases conducting at the end of the synchronizing pulse, the capacitor 44 retains its charge, tending to maintain the cathode 30 at a high positive potential. This potential may be so high that, upon the appearance of the next pulse 53 at the grid 23 of tube 24, the cathode 30 may be too positive for tube 24 to conduct. In this case, capacitor 44 discharges through resistor 35 and tube 32 which is conducting. This discharge continues until either the synchronizing pulse 52 stops or the cathode 30 reaches a point at which tube 24 can conduct. This action tends to maintain the voltage across the capacitor 44 at a level determined by the amplitude of the pulse 53. The diode 36 permits the potential across the capacitor 44 to follow the value of the pulse 53 equally rapidly in either direction by equalizing the impedances of the charging and discharging circuits. As pointed out before, the charging path is through tube 24 and resistor 35 which is a low resistance path. The polarity of the diode 36 is such that it does not conduct at this time. The discharge path is through tube 32 and resistor 35 paralleled by the diode 36, a path having approximately the same impedance as the charging path but which, in the absence of the diode 36, would be of higher impedance. The voltage across the capacitor 44 is shown in Fig. 2*d*. Assuming the voltage across capacitor 44 to be at a normal level when a synchronizing pulse **52*a* comes through early with respect to the leading edge 51 of the wave form 50, the voltage on the cathode 30 of the tube 24 will be too high for the pulse 53*a* at the grid to cause it to conduct, and tube 24 will not conduct and capacitor 44 will discharge through tube 32 from a level $e_2$ to a level $e_1$, as represented by the line 54. Upon the arrival at time $t_2$ of a synchronizing pulse 52*b* coincident with the leading edge 51 of the wave form 50, the voltage $e_1$ across the capacitor 44 is sufficiently low to permit the tube 24 to conduct, charging the capacitor and raising its potential along the line 55 back to the level $e_2$. Upon the arrival at time $t_3$ of a synchronizing pulse 52*c* that trails the leading edge 51 of the wave form 50, the voltage $e_2$ across the capacitor 44 is sufficiently low to permit the tube 24 to conduct, charging the capacitor 44 and raising its voltage along the line 56 to a level $e_3$ where the tube 24 can no longer conduct. This voltage is maintained across the capacitor 44 until the next synchronizing pulse 52 occurs. This potential is applied through the isolating cathode follower 34 and over conductor 47 to the oscillator 10** to maintain the frequency of the oscillator at the desired value.

It will be seen that the capacitor 44 acts as a memory to maintain the potential determined by the phase difference between the oscillator wave form 50 and the synchronizing pulse 53 during the interval between synchronizing pulses, thus maintaining the control point of the oscillator 10 at a potential which will produce the desired frequency.

This invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:

1. In a controlled oscillator system, a voltage-sensitive oscillator to be controlled, means to rectify the output of the oscillator, a source of synchronizing pulses, a normally nonconducting cathode follower, means to apply the rectified output of the oscillator to the input of the cathode follower, an electron discharge device having a control grid, said device being arranged to act as the cathode impedance of the cathode follower, means to couple the synchronizing pulses to the grid of this device, and means to apply the voltage developed across this device to the controlled oscillator in a manner to control its operating frequency.

2. In a controlled oscillator system, a voltage-sensitive oscillator to be controlled producing a wave form having an appreciable rise time, means to rectify the output of the oscillator, a source of synchronizing pulses of short duration and of an amplitude greater than the output of the controlled oscillator, a normally non-conducting cathode follower, means to apply the rectified output of the oscillator to the input of the cathode follower, an electron discharge device having a control grid, said device being arranged to act as the cathode impedance of the cathode follower, means to couple the synchronizing pulses to the grid of this device, and means to apply the voltage developed across this device to the controlled oscillator in a manner to control its operating frequency.

3. In a controlled oscillator system, a voltage-sensitive oscillator to be controlled producing a wave form having an appreciable rise time, means to rectify the output of the oscillator, a source of synchronizing pulses of short duration and of an amplitude greater than the output of the controlled oscillator, a normally non-conducting cathode follower, means to apply the rectified output of the oscillator to the input of the cathode follower, an electron discharge device having a control grid, said device being arranged to act as the cathode impedance of the cathode follower, means to couple the synchronizing pulses to the grid of this device, and means comprising a capacitor shunting the device to apply the voltage developed across this device to the controlled oscillator in a manner to control its operating frequency.

4. In a phase discriminator, a rectifier, means to apply a first wave form to the input to the rectifier, a normally non-conducting cathode follower, means to apply the output of the rectifier to the cathode follower, an electron discharge device having a control grid, a plate and a cathode, means to utilize this device as the cathode load impedance of the cathode follower, and means to couple a second train of pulses to the grid of this device to produce a voltage of an amplitude dependent on the difference in phase between the two pulse trains.

5. In a phase discriminator, a rectifier, means to apply a first train of pulses having an appreciable rise time to the input to the rectifier, a normally non-conducting cathode follower, means to apply the output of the rectifier to the cathode follower, an electron discharge device having a control grid, a plate and a cathode, means to utilize this device as the cathode load impedance of the cathode follower, and means to couple a second train of pulses of short duration and greater amplitude than the first pulses to the grid of this device to produce a voltage of an amplitude dependent on the difference in phase between the two pulse trains.

6. In a phase discriminator, a rectifier, means to apply a first train of pulses having an appreciable rise time to the input to the rectifier, a normally non-conducting cathode follower, means to apply the output of the rectifier to the cathode follower, an electron discharge device having a control grid, a plate and a cathode, means to utilize this device as the cathode load impedance of the cathode follower, means to couple a second train of pulses of short duration and greater amplitude than the first pulses to the grid of this device, and means comprising a capacitor shunting the device to produce a voltage of an amplitude dependent on the difference in phase between the two pulse trains.

7. An electronic circuit comprising a free running oscillator of the type which is frequency sensitive to a control voltage, a pulse generator for providing synchronizing pulses to control the frequency and phase of said oscillator, means connecting the output of said oscillator to a rectifier, biasing means for normally preventing conduction through said rectifier, said pulse generator being coupled to said rectifier to cause said rectifier to conduct in response to said synchronizing pulses, means for impressing the output from said rectifier upon the control grid of a cathode follower to cause a control voltage to be developed across the cathode load of said cathode follower, and means connected between said cathode load and said oscillator for applying said control voltage to said oscillator to control the frequency and phase of its oscillations.

8. An electronic system comprising a free running oscillator of the type which is frequency sensitive to a control voltage, a pulse generator for providing synchronizing pulses to control the frequency and phase of said oscillator, a first cathode follower stage, means for impressing the output of said oscillator on the input to said first stage, means connecting the output of said first stage to one terminal of a rectifier, the other terminal of said rectifier being connected to a source of biasing potential for normally preventing conduction through said rectifier, means coupling said pulse generator to said rectifier to cause said rectifier to conduct in response to said synchronizing pulses, means for impressing the output from said rectifier upon the input of a second cathode follower stage to cause a control voltage to be developed across the cathode load of said second stage, and means connected between said second stage and said oscillator for applying said control voltage to said oscillator to control the frequency and phase of its oscillations.

9. An electronic system as defined in claim 8 wherein the cathode load of said second cathode follower stage comprises a grid controllable electron discharge device, said system further including means for impressing said synchronizing pulses on the control grid of said discharge device.

References Cited in the file of this patent

UNITED STATES PATENTS

| | | |
|---|---|---|
| 2,463,685 | Fredendall et al. | Mar. 8, 1949 |
| 2,521,058 | Goldberg | Sept. 5, 1950 |
| 2,717,959 | Beste | Sept. 13, 1955 |